No. 617,168. Patented Jan. 3, 1899.
R. A. LACKMAN.
THAWING APPARATUS.
(Application filed Mar. 25, 1898.)
(No Model.)
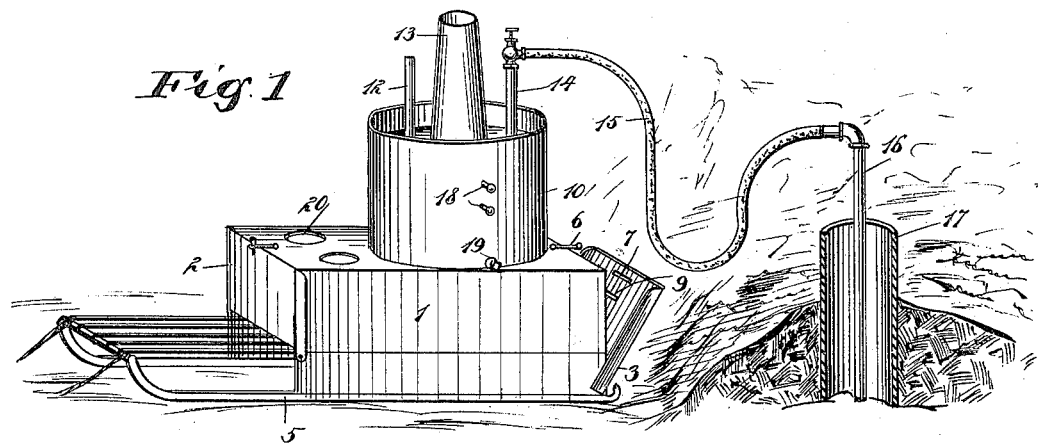
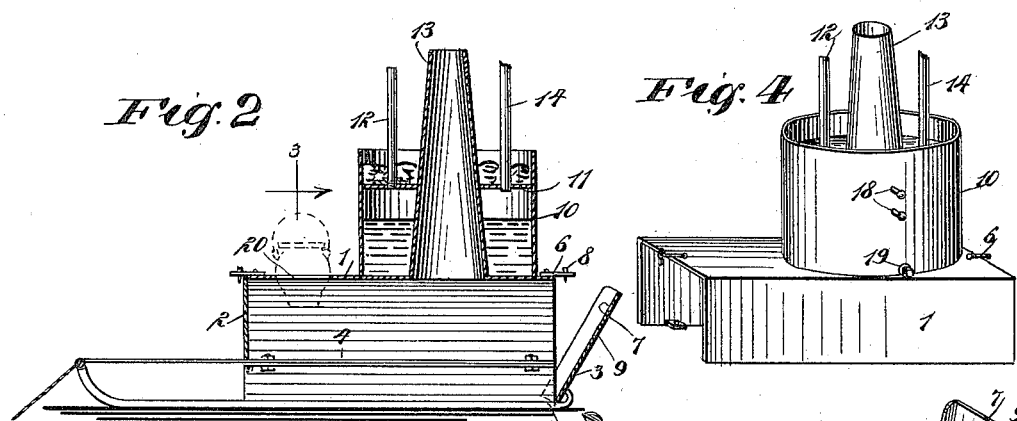
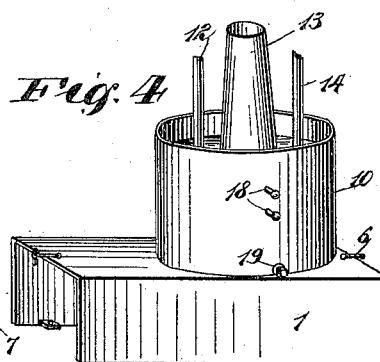
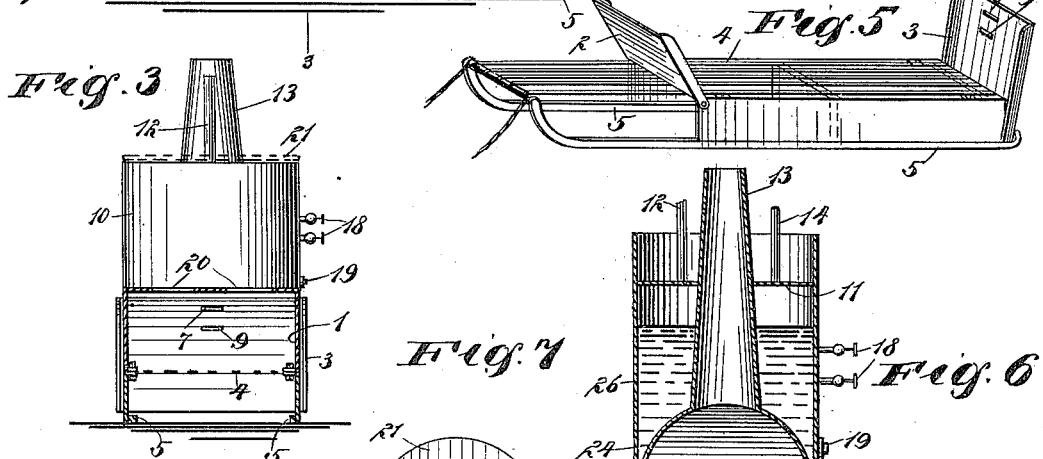
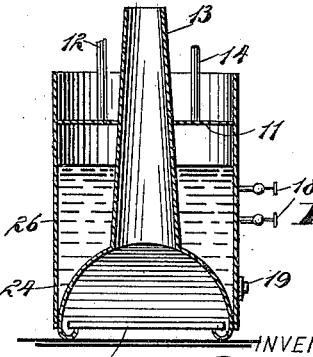
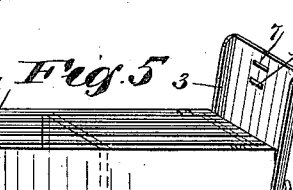
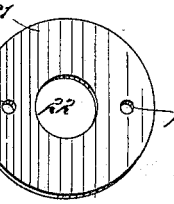
WITNESSES:
INVENTOR
R. A. Lackman
BY
ATTORNEYS.
THE NORRIS PETERS CO., PHOTO-LITHO., WASHINGTON, D. C.

UNITED STATES PATENT OFFICE.

RAYMOND A. LACKMAN, OF EARLING, IOWA, ASSIGNOR OF ONE-HALF TO FREDERICK SCHEEL, OF SAME PLACE.

THAWING APPARATUS.

SPECIFICATION forming part of Letters Patent No. 617,168, dated January 3, 1899.

Application filed March 25, 1898. Serial No. 675,157. (No model.)

*To all whom it may concern:*

Be it known that I, RAYMOND A. LACKMAN, of Earling, in the county of Shelby and State of Iowa, have invented a new and Improved Thawing Apparatus, of which the following is a full, clear, and exact description.

This invention relates to apparatus for thawing frost in the ground; and the object is to provide an apparatus for this purpose that may be easily transported from place to place and with which the thawing medium (steam) may be quickly generated and discharged into the ground.

A further object is to so construct the device that it may be used for cooking and baking purposes.

I will describe a thawing apparatus embodying my invention and then point out the novel features in the appended claims.

Reference is to be had to the accompanying drawings, forming a part of this specification, in which similar characters of reference indicate corresponding parts in all the views.

Figure 1 is a perspective view of a thawing apparatus embodying my invention. Fig. 2 is a longitudinal vertical section. Fig. 3 is a section on the line 3 3 of Fig. 2. Fig. 4 is a perspective view of the heater and boiler removed from the sled. Fig. 5 is a perspective view of the sled with the heater and boiler removed. Fig. 6 is a sectional elevation showing a modification, and Fig. 7 shows a cover that may be employed when the device is used for baking purposes.

The apparatus comprises a box-like heater 1, open at its bottom and having a hinged front door 2 and a rear door 3. The lower edge of the door 2 is on a level with a grate 4 for the heater. The rear door 3, however, is not hinged, but when the device is in use the lower edge of this rear door engages with rearwardly and upwardly turned ends of runners 5 of a sled on which the heater is mounted. This rear door 3 is held closed by means of a bar 6, extended from the top of the heater and through an opening 7 in the door, and a pin 8 will be extended through a hole in the bar 6 to engage against the outer surface of the door.

The heater is removably attached to the sled; but the grate is a fixture, forming a top for the sled when it is desired to use the sled for other purposes than transporting the thawing apparatus. It will be noted that the sled has side pieces which extend from the grate to the runners.

When the heater is to be transported or drawn over the snow, the rear door 3 is to be lifted up, so that its lower edge will be substantially on a level with the grate, and it is held in this position by means of the bar 6, passing through an opening 9 in the door. Both doors have side flanges to engage against the outer side of the heater.

Mounted on the heater is a boiler 10, and in this boiler 10, a short distance below its top, is a partition 11. The space in the boiler above the partition 11 is designed to receive snow for the purpose of melting it, and after the melting the water may be run into the boiler through an opening in the partition 11 and normally closed by a plug 12, which also serves as a safety-plug. A flue 13 extends from the heater up through the partition 11, and also extended through the partition is a steam-pipe 14, with which a flexible pipe 15 may be connected, the other end of said flexible pipe 15 being connected to a tube 16, designed to be inserted into a boring-tube 17, forced into the ground. The boiler is provided with gage-cocks 18, and it is also provided with a plug-closed outlet 19 for drawing off the water when the device is not desired for use.

The top of the heater forward of the boiler 10 is provided with holes 20, in which cooking utensils may be placed. The space above the partition 11 not only forms a receptacle for snow to be melted or water to be run into the boiler, but it forms an oven for the baking of bread or the like, and when the device is used for baking a cover 21 is to be placed upon the top of the boiler, as indicated by dotted lines in Fig. 3. The cover 21 is provided with a central opening 22, through which the flue 13 may pass, and it is also provided with a hole 23 for the passage of the steam-pipe 14 and a hole 23$^a$ for the passage of the plug 12.

The heater above described is rectangular,

In Fig. 6, however, I have shown it in the form of a half-cylinder 24, the lower side edges of which are turned upward to support a removable grate 25, and the boiler 26 in this example extends down along the sides of the heater. As the heater is open at the bottom, it is obvious that the ashes falling through the grate will fall upon the ground, so that there will be no necessity for cleaning out ashes.

It is obvious that when the device is not in use for thawing purposes it may be employed for storing provisions. It also may be employed for transporting articles packed in it, or the heater and boiler may be removed and the sled used for transporting articles, in which event the door 2, hinged to the sled, is to be turned down on the grate, and the door 3 may also be placed on the grate, thus forming a closed top or platform.

It is designed that wood shall be used as the fuel, and as the flue 13 passes through the boiler the heat of the products of combustion passing through the flue will aid materially in heating the water.

Having thus described my invention, I claim as new and desire to secure by Letters Patent—

1. The combination with a sled, of a heater removably mounted thereon, a grate for the heater and forming a top for the sled, a door for the heater, hinged to the sled and adapted to turn down thereon, and a boiler on the heater, substantially as specified.

2. A thawing apparatus, comprising a heater mounted on runners, a door for the rear end of the heater, the lower portion of said door being held in position by upwardly-turned portions of the runners, means for holding the upper portion of the door in position, a hinged front door, a grate for the heater, and a boiler on the heater, substantially as specified.

3. A heater, having a hinged door at its front end, runners upon which the heater is mounted and having upwardly-turned portions at the rear end, a rear door adapted to engage with its lower edge upon the runners and against the upturned portions, and a securing-rod extended from the top of the heater and designed to pass through either one of two openings made in said rear door, substantially as specified.

RAYMOND A. LACKMAN.

Witnesses:
FRANK NAUROTH,
W. V. KUHL.